United States Patent [19]

Chung et al.

[11] 4,365,119

[45] Dec. 21, 1982

[54] AUTOMATICALLY ADJUSTABLE BIDIRECTIONAL-TO-UNIDIRECTIONAL TRANSMISSION NETWORK

[75] Inventors: Li-Jin W. Chung, Burlington, N.C.; Ernest P. Moore, Berkeley Heights, N.J.; Glendon R. Porter, Denville, N.J.; Joseph F. Rizzo, Lodi, N.J.

[73] Assignee: Bell Telephone Laboratories, Incorporated, Murray Hill, N.J.

[21] Appl. No.: 173,014

[22] Filed: Jul. 28, 1980

[51] Int. Cl.³ ............................................. H04B 3/20
[52] U.S. Cl. ............................. 179/170.2; 179/170 D
[58] Field of Search ........ 179/170 R, 170 D, 170 NC, 179/170.2, 170.6, 170.8

[56] References Cited

U.S. PATENT DOCUMENTS

| | | | |
|---|---|---|---|
| 3,982,080 | 9/1976 | Ukeiley | 179/170 D |
| 4,074,087 | 2/1978 | Blake et al. | 179/170.2 |
| 4,096,361 | 6/1978 | Crawford | 179/170 D |
| 4,096,362 | 6/1978 | Crawford | 179/170 D |
| 4,275,276 | 6/1981 | Rizzo | 179/170 D |
| 4,278,848 | 7/1981 | Rizzo et al. | 179/170 D |

*Primary Examiner*—Joseph A. Popek
*Attorney, Agent, or Firm*—Thomas Stafford

[57] ABSTRACT

"Transhybrid" loss is maximized in a transmission network of the active canceler type employed to couple receive and transmit unidirectional transmission paths to a bidirectional transmission path including 2-wire nonloaded type cable by controllably adjusting impedance elements of the canceler circuit in a prescribed sequence to obtain amplitude nulls of signals detected on the transmit path while supplying individual ones of a plurality of single frequency test signals to the receive path. The adjustment sequence comprises a first procedure including a plurality of iterative adjustments of predetermined impedance elements in predetermined groups until no changes in the impedance settings occur and multiple iterative adjustment of predetermined groups until no changes in the impedance settings occur. If frequencies become equal at which poles and zeros occur associated with predetermined ones of the impedance elements, the impedance values of those elements are fixed in prescribed relationship and a second procedure is employed to adjust others of the canceler elements. The impedance elements to be adjusted and the adjustment sequence are selected to rapidly converge the canceler circuit to an optimum transfer function for generating a correction signal which is substantially a replica of an error signal to be canceled from the transmit path.

10 Claims, 11 Drawing Figures

AUTOMATICALLY ADJUSTABLE BIDIRECTIONAL-TO-UNIDIRECTIONAL TRANSMISSION NETWORK

CROSS-REFERENCE TO RELATED APPLICATIONS

Our copending U.S. patent applications Ser. Nos. 173,020 and 173,011 were filed concurrently herewith.

TECHNICAL FIELD

This invention relates to transmission networks, and, more particularly, to circuit arrangements for automatically adjusting bidirectional-to-unidirectional transmission networks to maximize signal loss between a receive unidirectional path or facility and a transmit unidirectional path or facility.

BACKGROUND OF THE INVENTION

A number of arrangements are known in the art for coupling signals from a bidirectional transmission path or facility to receive and transmit unidirectional transmission paths or facilities. One example of this type transmission network is employed to couple a two-wire bidirectional telephone transmission facility to a four-wire telephone transmission facility.

As is now known, it is desirable to adjust a complex impedance circuit in the transmission coupling network in order to obtain a better match to the impedance of the bidirectional transmission path or facility, thereby maximizing loss between the receive and transmit unidirectional paths or facilities. This is commonly referred to as maximizing "transhybrid" loss.

Many transmission networks employ so-called hybrid networks to realize the desired bidirectional-to-unidirectional coupling. Transmission networks employing either hybrid transformers or electronic circuits are now commonly employed in telephone transmission systems for this purpose. In using either a hybrid transformer or an electronic "hybrid" it is desirable to employ a network having an impedance which substantially matches the impedance of the bidirectional transmission facility. Otherwise, low transhybrid loss results which, in turn, yields unwanted signal reflections. That is to say, a portion of the signal on the receive unidirectional path or facility appears in the transmit unidirectional path or facility. To this end, in transformer type hybrids, a complex impedance network is employed in an attempt at matching the impedance of the bidirectional path or facility. Similarly, in electronic canceler type "hybrids," a network having a complex transfer (impedance) characteristic is employed to generate a correction signal in attempting to cancel an unwanted error signal appearing as a component of the signal to be transmitted on the transmit unidirectional path or facility.

In either arrangement adjustable impedance networks have been used in order to obtain a better impedance match to the bidirectional facility and, hence, to maximize transhybrid loss.

In transmission networks which employ hybrid transformers, it has become the practice to employ an electronic network to generate a driving point impedance which emulates the complex impedance of the bidirectional transmission facility and, thereby, balance the hybrid transformer. Similarly, in transmission networks which employ canceler arrangements, an active impedance network is employed having a complex transfer characteristic which emulates the impedance characteristic of the bidirectional facility in order to generate the correction signal used for canceling the unwanted error signal in the transmit path or facility. A substantially fixed impedance canceler circuit is disclosed in U.S. Pat. No. 4,074,087 issued to R. B. Blake, Jr., et al., on Feb. 14, 1978.

In a copending application of J. F. Rizzo and J. A. Rudisill, Jr., Ser. No. 064,041, filed Aug. 6, 1979, now U.S. Pat. No. 4,278,848, issued July 14, 1981, an arrangement is disclosed for automatically adjusting impedance elements of an adjustable impedance network in an attempt at obtaining an optimum match to a particular nonloaded bidirectional transmission facility. The arrangement employs individual tones, which are supplied to a receive port of a transmission network while corresponding individual impedance elements are adjusted until an amplitude null is detected at a transmit port of the transmission network. The tone signals are supplied and the amplitude adjustments are made in a prescribed sequence in order to obtain the best match to the impedance of the bidirectional facility. The disclosed procedure rapidly yields an optimum match for a nonloaded bidirectional facility when adjusting an impedance network intended for use with hybrid transformer coupling arrangements.

However, when employing canceler type impedance circuits, it is extremely important to select the proper variables to adjust in order to obtain an optimum impedance match to the bidirectional facility and the proper adjustment sequence for converging the variables rapidly to the right settings for yielding the optimum match. We have learned from experimentation that the variables, adjustment sequence and signals employed cannot be arbitrarily chosen and still obtain the desired optimum result. Indeed, the wrong choice may result in adjustment of the canceler impedance to generate a transfer function which may not even closely match the bidirectional facility impedance. This would result in undesirable signal reflections.

SUMMARY OF THE INVENTION

"Transhybrid" loss is maximized in a transmission network of the canceler type for coupling receive and transmit unidirectional paths or facilities to a bidirectional path or facility of the nonloaded type, in accordance with an aspect of the invention, by employing a canceler circuit having a specific circuit topology and by controllably adjusting impedance elements of the adjustable impedance canceler circuit in the transmission network in a prescribed sequence to obtain amplitude nulls of test signals in the transmit unidirectional path or facility when supplying individual ones of a plurality of the test signals via the receive unidirectional path or facility to the canceler. The test signals include at least first, second and third test signals, each having a predetermined frequency and amplitude. The adjustment sequence includes a plurality of iterative adjustments of predetermined groups of the adjustable impedance elements until no change on the impedance adjustments of the elements in the individual groups occurs and multiple iterative adjustment of predetermined groups of the impedance elements until no change in the impedance adjustments of the elements occurs. Consequently, the canceler circuit impedances are rapidly adjusted to obtain a transfer function for generating a correction signal which is substantially a replica of an error signal developed because of the bidirectional path or facility impedance.

More specifically, the canceler circuit topology is such as to generate a transfer characteristic having a fourth order function wherein a pole and zero of a first pole-zero pair occur at frequencies in direct proportion to each other, a pole and zero of a second pole-zero pair occur at frequencies in direct proportion to each other, a pole and zero of a third pole-zero pair occur at frequencies in fixed relationship to each other, a fourth zero occurs at a fixed frequency and a fourth pole occurs at frequencies in a prescribed range. The canceler circuit further includes a plurality of adjustable impedance elements to adjust the transfer function for generating the correction signal which substantially emulates an error signal developed in the network when a bidirectional path is connected thereto.

In accordance with another aspect of the invention, adjustment of predetermined ones of the adjustable impedance elements of the canceler circuit is controlled so that frequencies determined by those impedance elements at which poles and zeros occur in the transfer function are constrained to be in a prescribed relationship. Specifically, a predetermined first one of the impedance elements is controlled so that a first frequency determined thereby at which a corresponding pole or a zero occurs in the transfer function does not substantially exceed a second frequency determined by a predetermined second one of the impedance elements at which a corresponding pole or zero occurs in the transfer function.

In accordance with still another aspect of the invention, the first and second predetermined impedance elements are controlled so that when the first frequency is equal to or greater than the second frequency, the first impedance is set to a value in prescribed relationship to the value of the second impedance element at the second frequency.

In one embodiment of the invention the canceler impedance elements are adjusted in accordance with a first procedure including multiple iterative adjustment of predetermined ones of the impedance elements with corresponding test signals supplied to the receive path to obtain amplitude nulls of signals developed on the transmit path. If, during the first procedure, conditions are detected such that the first frequency at which a corresponding pole or zero occurs because of adjustment of the first impedance element is substantially equal to the second frequency at which a corresponding pole or zero occurs because of adjustment of the second impedance element, the values of the first and second impedance elements are set at the values when the first and second frequencies are substantially equal. Thereafter, a second procedure is employed to adjust third and fourth impedance elements in a prescribed sequence with predetermined ones of the test signals being supplied to the receive path until amplitude nulls are obtained of signals developed on the transmit path. Then, values of the third and fourth impedance elements obtained during predetermined steps of the second procedure are averaged and employed to set those impedance elements.

In accordance with another aspect of the invention, when it is determined that the first and second frequencies at which poles and zeros occur because of adjustment of the first and second impedance elements, respectively, are substantially equal, the impedance value of the first impedance element is set to a value in predetermined relationship to the second impedance value at the second frequency. Thereafter, both the first and second impedance values are fixed and the third and fourth impedance elements are adjusted in accordance with the second procedure.

BRIEF DESCRIPTION OF THE DRAWING

The invention will be more fully understood from the following detailed description of an illustrative embodiment thereof taken in connection with the appended figures, in which.

DETAILED DESCRIPTION

Figure 1:
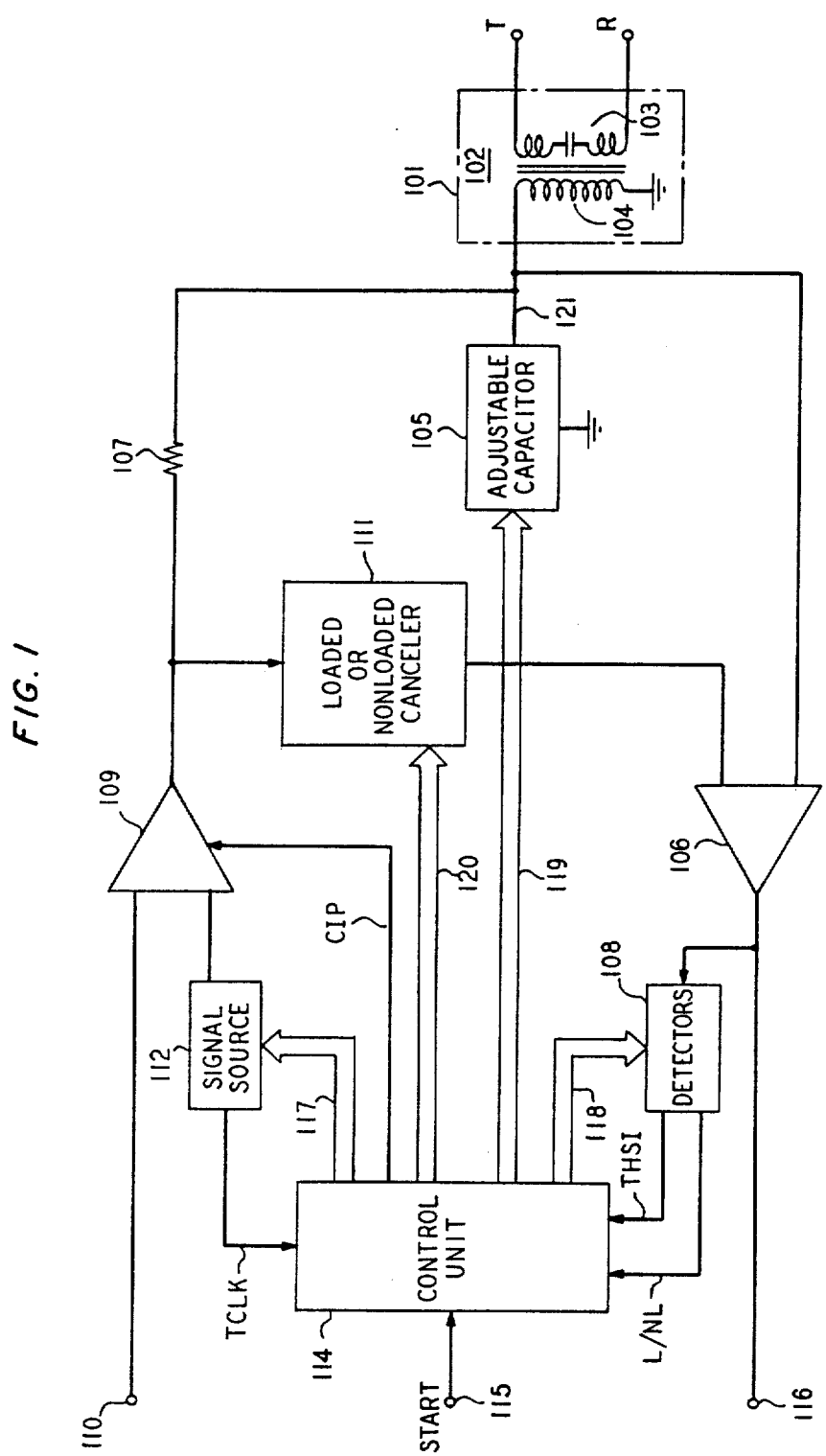
FIG. 1 shows in simplified block diagram form an automatically adjustable canceler type transmission network employing aspects of the invention to couple receive and transmit unidirectional transmission paths or facilities to a bidirectional transmission path or facility.

FIG. 1 shows in simplified form an automatically adjustable canceler type transmission network employed to couple receive and transmit unidirectional transmission paths or facilities to a bidirectional transmission path or facility. Such networks are intended for use in two- to four-wire transmission networks, two- to two-wire telephone repeaters, and similar coupling and repeater arrangements in widespread use in telephone transmission systems.

Canceler type transmission networks are employed to minimize unwanted signals appearing in the transmit path or facility because of the impedance of the bidirectional facility, coupling network and network build out capacitor. This minimization of the received signal appearing in the transmit path is commonly referred to as maximizing "transhybrid" loss in the coupling circuit. Since different lengths of bidirectional cable, as well as different cable gauges, are encountered in telecommunications systems, it is desirable that the transmission network be automatically adjustable to meet the various system needs with a minimum of human intervention and error. The automatically adjustable canceler type transmission network shown in FIG. 1 is intended to meet these various needs.

Accordingly, shown in FIG. 1 is coupling circuit 101 including transformer 102 having a first winding 103 and a second winding 104. Winding 103 is adapted to be connected via terminals T and R to a bidirectional transmission path or facility, for example, a two-wire telephone cable. Included in winding 103 is the usual midpoint capacitor employed in well-known fashion to extract signaling information. Winding 104 is adapted to be connected to receive and transmit unidirectional transmission paths or facilities. Although winding 104 is shown as being connected in single-ended configuration, it may equally be connected in a balanced configuration, as will be apparent to those skilled in the art. Transformer 102 may be any one of numerous coupling transformers known in the art and, preferably, has a 1:1 turns ratio.

In this example, a first terminal of winding 104 is connected to a reference potential point, for example, ground potential, while a second terminal of winding 104 is connected to adjustable capacitor 105, one input of gain unit 106 and one terminal of resistor 107. The output of gain unit 106 is adapted to be connected via terminal 116 to a transmit unidirectional path or facility and is connected to detectors 108. Similarly, one input of gain unit 109 is adapted to be connected via terminal 110 to a receive unidirectional path or facility. The output of gain unit 109 is connected to a second terminal of resistor 107 and to one input of canceler circuit 111. An output from canceler circuit 111 is connected to a second input of gain unit 106. An output of test signal source 112 is connected to a second input of gain unit 109.

Control unit 114 generates signals for controlling operation of the transmission network, in accordance with aspects of the invention, to automatically adjust capacitor 105 and canceler 111 for maximizing the transhybrid loss between receive terminal 110 and transmit terminal 116 when a bidirectional transmission path or facility is connected to terminals T and R. To this end, control signals are extended from control unit 114 via paths 119 to adjustable capacitor 105, via paths 118 to detectors 108, via paths 117 to signal source 112, via paths 120 to loaded or nonloaded canceler 111 and via path CIP to gain unit 109. Outputs L/NL and THSI from detectors 108 and output TCLK from signal source 112 are supplied to control unit 114. A signal for initiating operation of control circuit 114 is supplied as desired either automatically or manually via start terminal 225. Consequently, the capacitance value of adjustable capacitor 105 and the impedance function, i.e., transfer function, of canceler 111 are automatically adjusted as desired. Thus, the circuit automatically adjusts to compensate for changing network and/or bidirectional path or facility characteristics.

Signal source 112 under control of signals from control unit 114 supplies any of a plurality of test signals to a second input of gain unit 109, and hence, to the receive path or facility. Signal source 112 may be any of the numerous arrangements known in the art capable of controllably supplying the desired test signals. In this example, not to be construed as limiting the scope of the invention, signal source 112 is capable of generating a plurality of single frequency signals having predetermined amplitudes at 350 Hz, 1400 Hz, 2800 Hz, 3400 Hz, and 4000 Hz, and pseudo-random noise signals ERL and SRL-HI.

It should be noted that the ERL, SRL-HI, 3400 Hz and 4000 Hz signals are not used in adjusting the nonloaded canceler circuit to be described herein. The ERL, SRL-HI and 4000 Hz signals are used to adjust a loaded canceler as described in our copending application, Ser. No. 173,011, while the 3400 Hz signal is used in the cable type identification arrangement described in our copending application, Ser. No. 173,020, both filed concurrently herewith.

Gain units 106 and 109 are substantially unidirectional amplifiers of the differential type commonly referred to as operational amplifiers now well known in the art. Gain unit 109 also includes a switching arrangement to disconnect the receive path during operation of the invention. This is effected via signal CIP from control unit 114.

Adjustable capacitor 105 is adjusted in this example to a prescribed value because a network build out capacitor is typically not required with nonloaded cable. In an example from experimental practice, the prescribed capacitance value is 0.006 microfarads. Details of adjustable capacitor 105 are described in our copending application Ser. No. 173,011.

Figure 2:
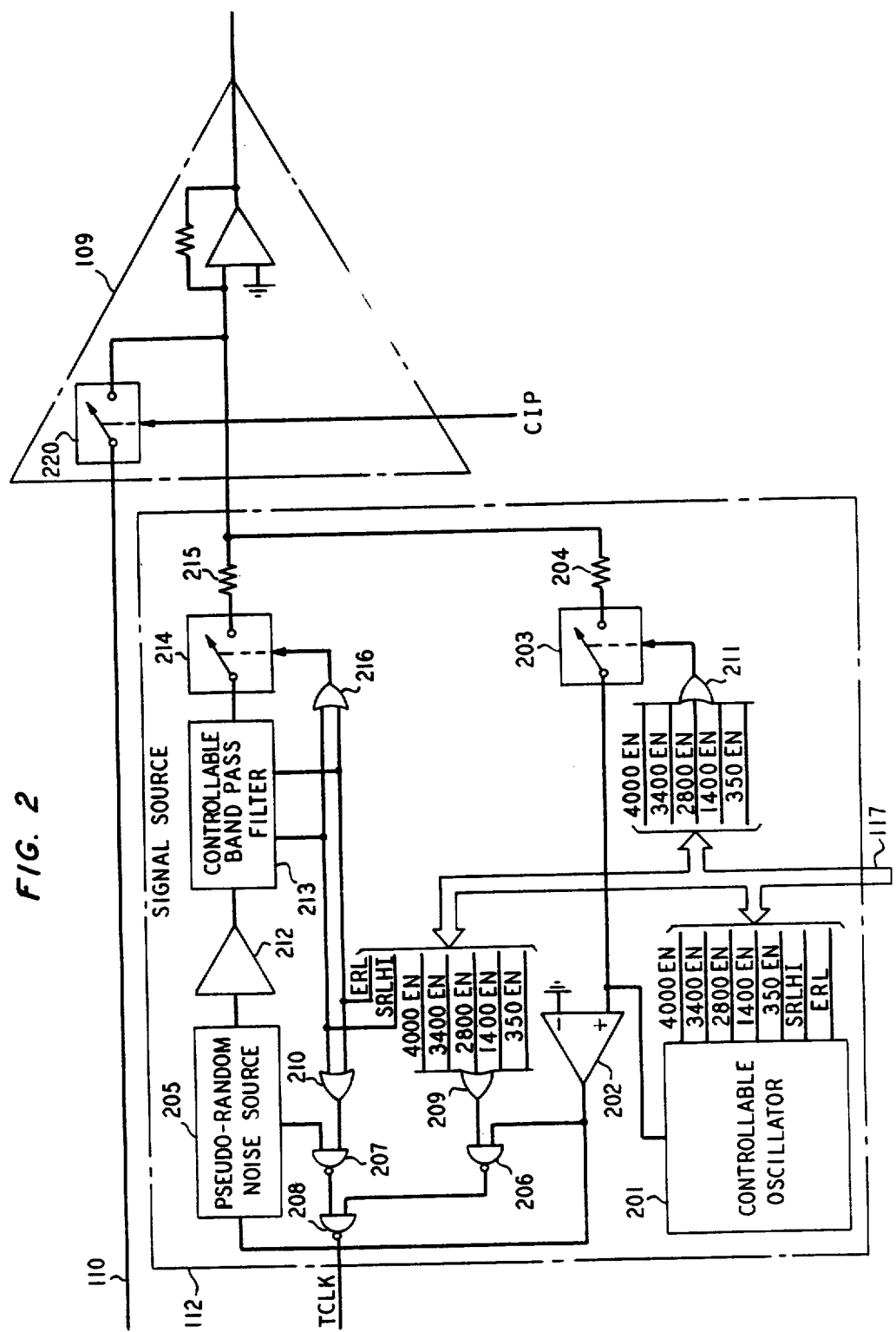
FIG. 2 depicts in simplified form details of the signal source and receive gain unit employed in the network of FIG. 1.

FIG. 2 shows in simplified form details of signal source 112 and its circuit relationship with gain unit 109 for insertion of the test signals into the receive path or facility. Accordingly, source 112 includes controllable oscillator 201 which is responsive to control signals supplied via paths 117 from control unit 114 for generating any one of a plurality of test signals. Specifically, oscillator 201 is responsive to control signals 350EN, 1400EN, 2800EN, 3400EN, 4000EN, ERL and SRL-HI to generate signals having frequencies of 350 Hz, 1400 Hz, 4000 Hz, 10,000 Hz, and 10,000 Hz, respectively. Any one of the numerous controllable oscillators known in the art may be employed for this purpose. The output of oscillator 201 is supplied to comparator 202 via switch 203 and resistor 204 to an input of gain unit 109. Switch 203 is enabled via OR gate 211 when any of control signals 350EN, 1400EN, 2800EN, 3400EN or 4000EN is present, and the corresponding single frequency test signals are being generated and therefore being supplied by gain unit 109 into the receive path. Comparator 202 is employed to convert the output of oscillator 201 to a square-wave signal. An output of comparator 202 is supplied to pseudo-random noise source 205 and one input of NAND gate 206. Pseudo-random noise source 205 generates a pseudo-random noise signal having a plurality of frequency components at a predetermined frequency spacing. The psuedo-random noise signal is supplied via buffer amplifier 212, controllable bandpass filter 213, switch 214 and resistor 215 to an input of gain unit 109. Switch 214 is enabled or disabled via OR gate 216 when either ERL or SRL-HI are present or absent to supply or inhibit the pseudo-random noise signal to or from gain unit 109, respectively. NAND gates 206, 207 and 208 are employed to generate signal TCLK which is a pulse signal having a frequency equal to the tone signal being supplied to gain unit 109. TCLK is supplied to control unit 114 where it is used for timing synchronization. OR gate 209 is employed to enable NAND gate 206 only when control signals 350EN, 1400EN, 2800EN, 3400EN or 4000EN are present. Otherwise, NAND gate 206 is disabled. Similarly, OR gate 210 is used to enable NAND gate 207 only when either ERL or SRL-HI are present. Control signal CIP is employed to disable or enable switch 220, thereby cutting or connecting, respectively, the receive unidirectional path or facility.

Figure 3:
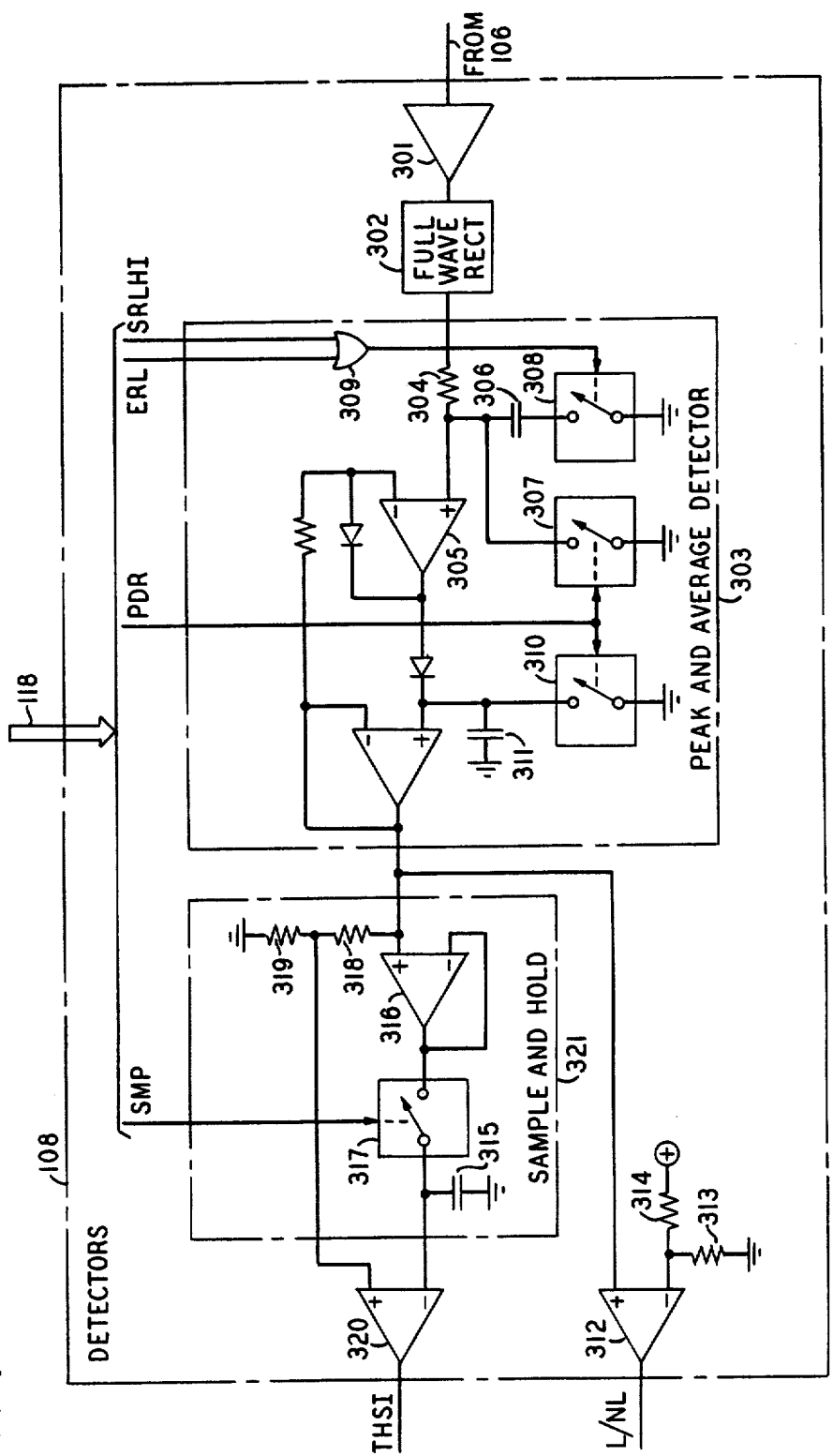
FIG. 3 shows details of the detectors employed in the network of FIG. 1.

FIG. 3 shows in simplified form details of detectors 108. A signal developed at the output of gain unit 106 is supplied via buffer amplifier 301 to full wave rectifier 302. In turn, the full wave rectified output from rectifier 302 is supplied to peak and average detector 303. To this end, the full wave rectified signal is supplied via resistor 304 to one input of amplifier 305, averaging capacitor 306 and one terminal of controllable switch 307. Averaging capacitor 306 is controllably connected in circuit between the first input of amplifier 305 and ground potential by switch 308 in response to an output from OR gate 309 when either ERL or SRL-HI are present. Connection of capacitor 306 in circuit converts detector 303 to an averaging detector. When capacitor 306 is out of circuit, detector 303 is a peak detector, as will be apparent to those skilled in the art. Switches 307 and 310 are employed to connect a shunt to ground potential across averaging capacitor 306 and across peak capacitor 311, respectively, in response to control signal PDR when detector 303 is re-set to an initial condition. An output from peak and average detector 303 is supplied to an input of L/NL detector comparator 312 and to an input of sample and hold 321. Comparator 312 is employed to compare the peak output of detector 303 with a predetermined threshold established by the voltage divider formed by resistors 313 and 314 to determine whether the bidirectional path or facility connects to terminals T and R (FIG. 1) is a loaded type cable or a nonloaded type cable. Output L/NL is supplied to control unit 114 where it is employed to control connection of an appropriate circuit in canceler 111 and to effect the automatic adjustment process corresponding to that canceler circuit. Operation of this identification function is further described in our copending application, Ser. No. 173,020, filed even date herewith. The output from detector 303 is controllably supplied to holding capacitor 315 via buffer amplifier 316 and controllable switch 317. Switch 317 is controlled via control signal SMP from control unit 114. A signal developed at the junction of resistors 318 and 319 is supplied to a first input of comparator 320 while a signal developed across capacitor 315 is supplied to a second input of comparator 320. Resistors 318 and 319 form a voltage divider in which the resistance value of resistor 319 is approximately 40 times than the resistance value of resistor 318. This establishes a prescribed detection threshold for determining whether the output of peak and average detector 303 is greater than the output from sample and hold 321. Comparator 320 yields an indication of whether the presently detected peak or average value from peak and average detector 303 is larger or smaller than the last sampled value stored on capacitor 315. An output from comparator 320 designated THSI is supplied to control unit 114 (FIG. 1). The signal developed at output THSI is limited either to a positive potential representative of a logical "1" or to substantially zero potential representative of a logical "0". The logical "1" THSI output indicates that the presently detected peak or average value from detector 303 is greater than the last sampled peak or average value stored on capacitor 315. Conversely, the logical "0" output indicates that the presently detected peak or average value from detector 303 is less than the last sampled peak or average value stored on capacitor 315. Control signal PDR controls resetting of peak and average detector 303 to an initial condition while control signal SMP controls sampling of the output from detector 303.

Figure 4:
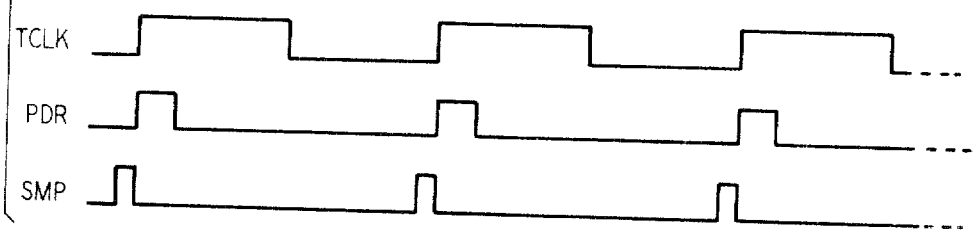
FIG. 4 depicts a sequence of waveforms useful in describing the operation of the detectors illustrated in FIG. 3.

FIG. 4 is a timing diagram illustrating the peak and average detecting, sampling and interrogating process. Signals PDR and SMP are generated by control unit 114 (FIG. 1) in prescribed relationship to signal TCLK from tone source 112 (FIG. 1). Similarly, output THSI from comparator 319 is interrogated by control logic 114 just before the output from detector 303 is again sampled. That is, THSI is sampled just prior to generation of SMP. Signal TCLK is a pulse signal having the same frequency as the individual tone signal being generated by source 112. When the pseudo-random noise signals are being generated, TCLK is a pulse signal of approximately 100 microseconds duration occurring at the beginning of each 10 millisecond pseudo-random noise signal cycle.

Figure 5:
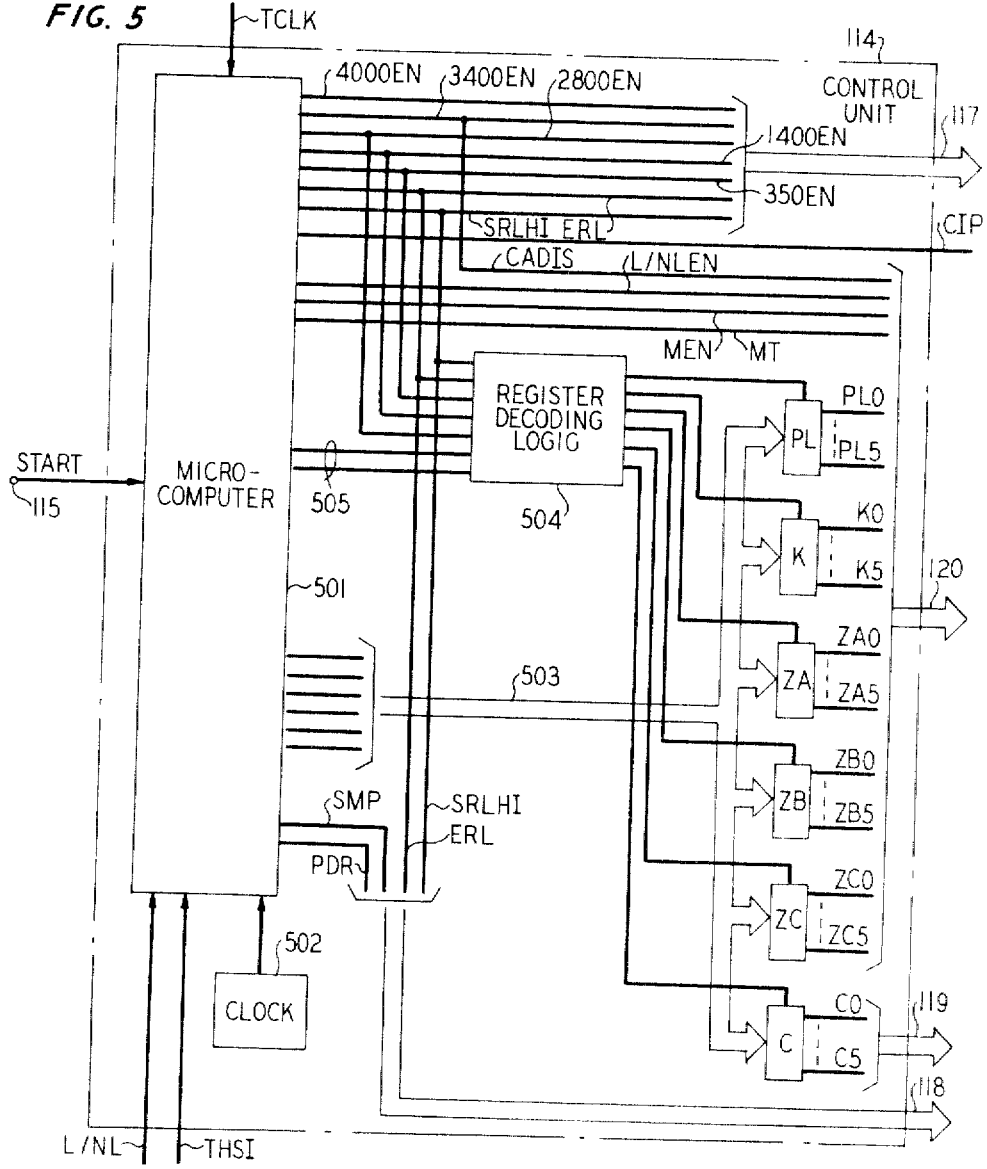
FIG. 5 shows in simplified form details of the control unit employed in the network of FIG. 1.

FIG. 5 shows in simplified form details of control unit 114. Control unit 114 includes microcomputer 501, which may be any of the microcomputer systems including a CPU, RAM, ROM and an I/O unit now known in the art. Additionally, microcomputer 501 includes a plurality of working registers which are employed in the process of generating control signals for controlling operation of an embodiment of the invention. Programs for controlling generation of the desired control signals are stored in the ROM of microcomputer 501. Preferably, microcomputer 501 is an Intel 8748 commercially available. Details and programming of the Intel 8748 are described in "Intel MSC-48 Family of Single Chip Microcomputers—Users Manual," dated 1978. A timing signal for microcomputer 501 is obtained from clock circuit 502. Registers PL, K, ZA, ZB and ZC, and register C are employed to store digital signals representative of settings of impedance elements in canceler 111 and adjustable capacitor 105, respectively. The digital signals representative of the impedance settings are supplied to the corresponding registers from microcomputer 501 via paths 503. The appropriate one of the registers in which the digital signals are to be stored is enabled via a corresponding control signal from register decoding logic 504. Register decoding logic 504 is supplied with a code from microcomputer 501 via path 505 and is supplied with control signals 350EN, 1400EN, 2800EN, ERL and SRL-HI for determining which one of the registers is to be enabled for storing the digital signals representative of an impedance setting currently being supplied on paths 503 from microcomputer 501. Microcomputer 501 generates control signals, namely, 4000EN, 3400EN, 1400EN, 2800EN, 350EN, ERL, SRL-HI, CIP, CA DIS, N/NL EN, MT, MEN, SMP and PDR. Control signals 4000EN, 3400EN, 1400EN 2800EN, 350EN, ERL and SRL-HI are supplied via leads 117 to control operation of signal source 12. In turn, signal source 112 supplies TCLK to microcomputer 501. Control signal CIP is supplied to gain unit 109 to control connection of the receive path or facility. Control signals ERL, SRL-HI, SMP and PDR are supplied via leads 118 to control operation of detectors 108. In turn, detectors 108 supply signals L/NL and THSI to microcomputer 501. Similarly, impedance setting signals C0-C5 are supplied via leads 119 to control adjustable capacitor 105. Control signals CA IDS, L/NL EN, MT, MEN, PL0-PL5, K0-K5, ZA0-ZA5, ZB0-ZB5 and ZC0-ZC5 are supplied via leads 120 to canceler 111 where they are employed to control insertion and adjustment of the canceler circuit. Control signals PL0-PL5, K0-K5, ZA0–

ZA5, ZB0-ZB5, ZC0-ZC5 and C0-C5 are digital signals for controlling corresponding analog switching elements to adjust the associated impedance elements to desired impedance values.

Figure 6:
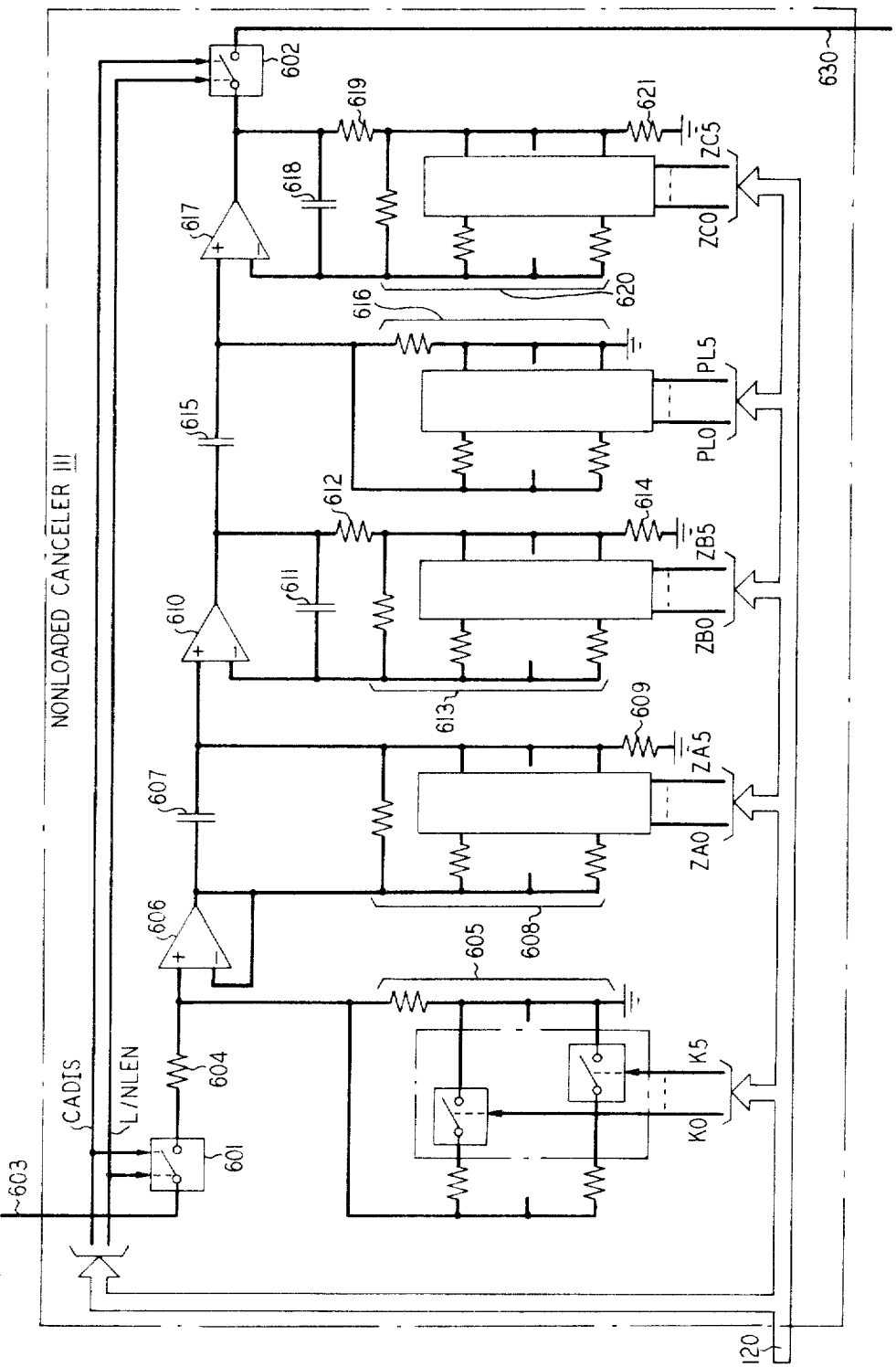
FIG. 6 illustrates in simplified form details of one nonloaded type canceler circuit used in the network of FIG. 1.

FIG. 6 shows details of one canceler circuit which may be employed in canceler 111 that is intended for use with various lengths and gauges of nonloaded 2-wire telephone cable. Transfer function G(s) realized by the circuit of FIG. 6 has been chosen so that canceler 111 generates in response to a signal from gain unit 109, i.e., the received signal, a correction signal which is substantially a replica of an error signal developed across winding 104 of coupling circuit 101 (FIG. 1). The correction signal is supplied to an input of gain unit 106 where it is algebraically combined with the transmit signal including the error signal developed across winding 104, thereby yielding an output from gain unit 106 which is substantially free of the error signal.

To this end, canceler 111 has a fourth-order transfer function $$G(s) = K \frac{s(s + z2)(s + z3)(s + z4)}{(s + p1)(s + p2)(s + p3)(s + p4)} \quad (1)$$

where the fixed zero at 0 and adjustable pole p1, affect the canceler attenuation versus frequency characteristic in the low frequency range below 500 Hz; adjustable pole-zero pair (p2, z2) affect the characteristic in the high frequency range above 2800 Hz; adjustable pole-zero pair (p3, z3) affect the characteristic in the mid-to-high frequency range of approximately 2800 Hz to 4000 Hz; and adjustable pole-zero pair (p4, z4) affect the characteristic in the mid-frequency range of approximately 500 Hz to 2800 Hz. Since it is desirable to employ the instant embodiment to match a number of different nonloaded 2-wire cable gauges and lengths, it is desirable to automatically adjust the transfer characteristic of canceler 111. Indeed, we have determined that both the choice of impedance elements to be adjusted and the adjustment sequence is critical to whether or not a rapid convergence to the right impedance adjustment (transfer function) is obtainable. Apparently, a choice of a wrong adjustment sequence and/or a wrong combination of impedance elements to be adjusted in the canceler results in adjustment of the transfer function so that the canceler does not generate the desired correction signal. Consequently, the error signal is not canceled and appears in the signal being transmitted. Additionally, we have determined that under certain conditions in the adjustment sequence, precautions must be taken in accordance with an aspect of the invention, to constrain predetermined ones of the impedance values in order to converge to an optimum transfer characteristic.

To this end, canceler 111 includes controllable switching elements 601 and 602 for controllably connecting and disconnecting canceler 111 in circuit between the output of gain unit 109 and an input of gain unit 106. Specifically, switching elements 601 and 602 are responsive to control signal L/NL for inserting an appropriate canceler 111 in circuit for loaded or nonloaded cable applications, and to CA DIS for disabling canceler 111, i.e., taking it out of circuit when the type facility identification process described in our copending application, Ser. No. 173,020, is enabled. The loaded canceler circuit is described in our copending application, Ser. No. 173,011. In this example, nonloaded cable is assumed.

Accordingly, signals are supplied from gain unit 109 via terminal 603 and switch 601 to a controllable voltage divider including resistor 604 and controllably adjustable resistor 605 where the signal is amplitude scaled (K). Adjustable resistor 605 in response to control signals K0-K5 from control unit 114, adjusts the amplitude scaling (K) in the adjustment process described below. The scaled signal is supplied via buffer amplifier 606 to capacitor 607 and adjustable resistor 608.

Capacitor 607, adjustable resistor 608 and resistor 609 are employed as shown in FIG. 6 to realize $$(s+z2)/(s+p2). \quad (2)$$

Resistor 608 is controllably adjustable in response to control signals ZA0-ZA5 from control unit 114 to accommodate different gauges of nonloaded cable. Specifically, ZA (608) is adjusted to obtain a better match to the specific cable gauge, for example, 22, 24 or 26 gauge in the frequency range above 2800 Hz. It is noted that adjustment of resistor 608 varies the frequencies at which both p2 and z2 occur, in accordance with an aspect of the invention, in a predetermined fixed relationship. This keeps to a minimum the number of impedance elements needed to rapidly adjust the function to an optimum value. Specifically, the fixed relationship of p2 and z2 in this example is $$p2 = z2 + \Delta \quad (3)$$

where $\Delta$ is a fixed value. This insures that p2 occurs at a frequency greater than the frequency at which z2 occurs and results in a more rapid adjustment to the optimum value.

An output from capacitor 607 and resistor 608 is supplied to a noninverting input of amplifier 610. Included in a feedback path between an output and an inverting input of amplifier 610 are capacitor 611 and the series connection of resistor 612 and adjustable resistor 613. Resistor 614 is connected between the junction of resistors 612 and 613 and ground potential. This circuit arrangement generates $$(s+z3)/(s+p3) \quad (4)$$

Resistor 613 is controllably adjustable in response to control signals ZB0-ZB5 from control unit 114 again to accommodate different gauges and lengths of cable in the mid-to-high frequency range, in this example, 2800 Hz to 4000 Hz. It is noted that resistor 613 varies the frequencies at which both p3 and z3 occur in a relationship in which p3 is directly proportional to z3. In this example, the proportional relationship is such that p3 occurs at a frequency lower than the frequency at which z3 occurs.

An output from amplifier 610 is supplied to capacitor 615 which, in combination with controllably adjustable resistor 616, as shown, generate $$s/(s+p1) \quad (5)$$

Resistor 616 is controllably adjustable in response to control signals PL0-PL5 from control unit 114 again to accommodate different gauges and lengths of cable in the low frequency range, in this example, below 500 Hz.

In turn, a signal from capacitor 615 is supplied to a noninverting input of amplifier 617. Included in a feedback path between an output and an inverting input of amplifier 617 are capacitor 618 and the series combination of resistor 619 and adjustable resistor 620. Resistor 621 is connected between the junction of resistors 619 and 620 and ground potential. This circuit arrangement generates $$(s+z4)/(s+p4) \quad (6)$$

Resistor 620 is controllably adjustable in response to control signals ZC0-ZC5 from control unit 114, again to accommodate different gauges and lengths of cable in the mid-frequency range of approximately 500 Hz to 2800 Hz. It is noted that resistor 620 varies the frequencies at which both p4 and z4 occur in a relationship in which p4 is directly proportional to z4. In this example, the proportional relationship is such that p4 occurs at a frequency lower than the frequency at which z4 occurs. An output from amplifier 617 is the desired correction signal, i.e., a replica of the error signal component developed across winding 104 (FIG. 1). The correction signal is supplied via switch 602 and circuit path 630 to gain unit 106 (FIG. 1).

We have determined that the frequencies at which pole p4 and zero z4 occur under control of ZC (resistor 620) should not substantially exceed the frequencies at which pole p3 and zero z3 occur under control of ZB. Otherwise, the transfer function diverges and is not adjusted to an optimum value. To avoid this, the register values of ZB and ZC which control adjustable resistors 613 and 620 and, hence, pole-zero pair (p3, z3) and pole-zero pair (p4, z4), respectively, are monitored to detect when the corresponding frequencies are substantially equal. In an example from experimental practice, not to be construed as limiting the scope of the invention, the relationship between the register values when the corresponding frequencies are equal is shown in the following table:

TABLE I

| ZB (DIGITAL) | ZC(NC) (DIGITAL) | FREQUENCY (HZ) |
| --- | --- | --- |
| 0 | 2 | 1736 |
| 1 | 4 | 2210 |
| 2 | 6 | 2663 |
| 3 | 8 | 3097 |
| 4 | 10 | 3512 |
| 5 | 12 | 3910 |
| 6 | 15 | 4292 |
| 7 | 17 | 4658 |
| 8 | 20 | 5010 |
| 9 | 23 | 5350 |
| 10 | 26 | 5675 |
| 11 | 30 | 5990 |
| 12 | 34 | 6292 |
| 13 | 38 | 6585 |
| 14 | 42 | 6866 |
| 15 | 47 | 7139 |
| 16 | 52 | 7400 |
| 17 | 58 | 7656 |
| 18 | 64 | 7900 |

Thus, if ZB is 18 or less and ZC (NC) is greater or equal to the corresponding NC value in the above table, the frequencies at which pole-zero pair p4,z4 occur at are equal to or greater than the frequencies at which the pole-zero pair p3,z3 occur. In such event, the ZB and ZC registers are set in accordance with an aspect of the invention to the detected values. This occurs when the frequency associated with ZC is equal to or does not substantially exceed the frequency associated with ZB. In accordance with another aspect of the invention, the value of ZB is set at the value of NC corresponding to the setting of ZC. By way of example, assume ZC has a setting of 12 and ZB is equal to or greater than NC, i.e., 34, then ZB is set to 34. Once set, the values of ZB and ZC and, hence, resistors 613 and 620, respectively, are fixed.

Operation of control unit 114 is generating control signals for adjusting the impedance elements of canceler 111, in accordance with aspects of the invention, is described below in conjunction with digital program flow charts shown in FIGS. 7 and 8. The programs described in the flow charts may be readily reduced to a program listing in assembly language for the Intel 8748 microcomputer system to describe a set of electrical control signals that serve to configure control unit 114 into a machine capable of generating control signals for controlling an embodiment of the invention for adjusting impedance elements of canceler 111 and of adjustable capacitor 105.

Figure 7:
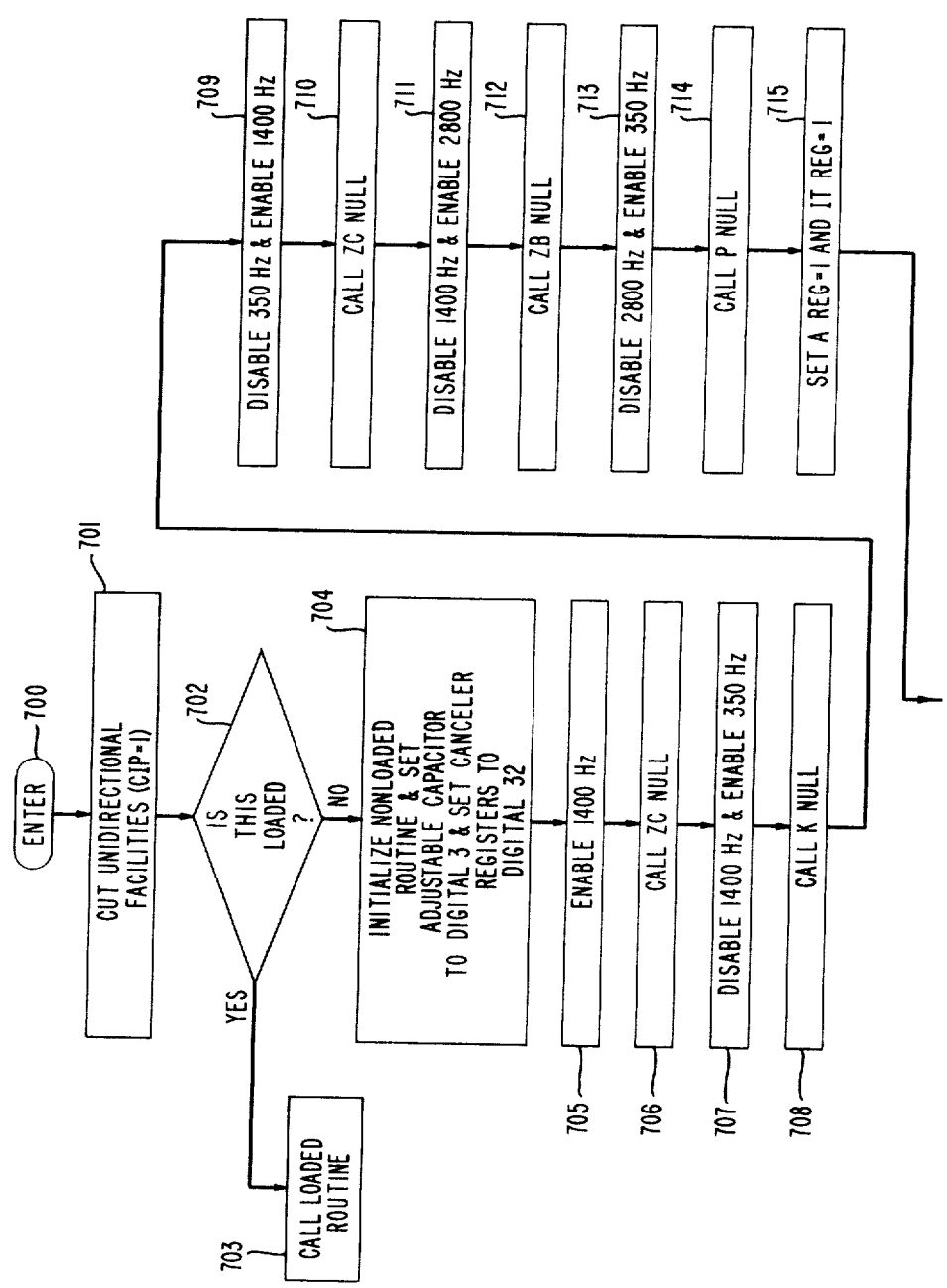
FIGS. 7, 8 and 9, when connected as shown in FIG. 10, form a flow chart of a program routine illustrating a sequence of steps employed in one embodiment of the invention for adjusting the adjustable capacitor and impedance elements of the canceler circuit used in the network of FIG. 1 in accordance with aspects of the invention to maximize the so-called "transhybrid" loss between the receive path or facility and the transmit path or facility.
Figure 10:
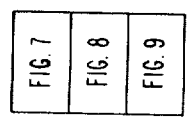

FIG. 7 shows a flow chart of a program routine for controlling the embodiment of the invention shown in FIG. 1 to maximize automatically the so-called "transhybrid" loss between the receive path or facility and the transmit path or facility primarily for nonloaded type 2-wire telephone cable connected to terminals T and R.

Accordingly, the routine is entered via oval 700. Operational block 701 causes CIP=1 to be generated to open circuit the receive path. In practice, the transmit path would also be open circuited or otherwise terminated.

Conditional branch point 702 tests to determine whether the cable is loaded or nonloaded. This determination would have been made by a test described in our copending application, Ser. No. 173,020, filed even date herewith. If the test result is yes, a loaded cable routine is called via block 703 as described in our copending application, Ser. No. 173,011, filed even date herewith. If the test result is no, the cable is nonloaded and the nonloaded cable routine continues.

Operational block 704 causes the nonloaded routine to be initialized and registers PL, K, ZA, ZB, and ZC to be set to a mid-value, in this example, of digital 32, and for register C to be set to a prescribed value, in this example, digital 3.

Operational block 705 causes control 1400EN to be generated, thereby enabling the corresponding circuits in control unit 114, signal source 112 and detectors 108 to generate a 1400 Hz signal and detect it.

Operational block 706 causes the null subroutine associated with adjusting impedance element 620 (ZC) via control signals ZC0-ZC5 controlling associated analog switching elements (FIG. 6) in accordance with the null adjustment and detector subroutine shown in FIG. 8 and described below. Simply stated, impedance element 620 (ZC) is adjusted with 1400 Hz supplied to the receive path until a signal null is detected in the transmit path via detectors 108. This adjusts ZC in the midfrequency range of canceler 111.

Operational block 707 causes the 1400 Hz signal to be disabled and the 350 Hz signal to be enabled.

Operational block 708 causes the null subroutine associated with adjusting impedance element 605(K) via control signals K0-K5 controlling associated analog switching elements. This adjusts the gain (K).

Operational block 709 causes 350 Hz to be disabled and 1400 Hz to be enabled.

Operational block 710 causes the ZC null subroutine to be effected again. This readjusts impedance 620 for interaction with the gain (K) adjustment.

Operational block 711 causes 1400 Hz to be disabled and 2800 Hz to be enabled.

Operational block 712 causes the null subroutine associated with adjusting impedance element 613 (ZB) via control signals ZB0-ZB5 to be effected. This adjusts the canceler characteristic in the high frequency range.

Operational block 713 causes 2800 Hz to be disabled and 350 Hz to be enabled.

Operational block 714 causes the null subroutine associated with adjusting impedance element 616 (PL) via control signals PL0-PL5 to be effected. This adjusts the lower frequency end of the canceler characteristic.

Operational block 715 causes working registers in microcomputer 501 designated A REG and IT REG be set to digital 1.

Operationals 701-715 are considered initialization of the nonloaded canceler characteristic.

Conditional branch point 716 performs a test to determine, in accordance with an aspect of the invention, whether the frequencies at which poles and zeros occur as determined by adjustment of impedance element 620 (ZC) and impedance element 613 (ZB) are in a prescribed relationship. Specifically, whether the frequency associated with ZC is equal to or is not substantially greater than the frequency associated with ZB. To this end, it is determined if IT REG is greater than 1 (this insures at least one pass through the first adjustment procedure), ZB is less than 18 and ZC is equal to or greater than NC associated with the setting of ZB as set out in Table 1 above and stored as a look-up table in microcomputer 501. If the test result is yes, then the frequency associated with ZC is equal to but not substantially greater than the frequency associated with ZB and the settings of ZB and ZC are fixed and control is transferred to operational block 728 and a second adjustment procedure is effected in accordance with and aspect of the invention. If the test result is no, control is transferred to operational block 717 and the first adjustment procedure continues.

Operational block 717 causes 350 Hz to be disabled and 1400 Hz to be enabled.

Operational block 718 causes the ZC null adjustment to be effected. This readjusts ZC in the midfrequency range.

Conditional branch point 719 again tests to determine whether the frequency associated with ZC is equal to or greater than the frequency associated with ZB. If the test result is yes, control is transferred to operational block 729 and the impedance setting of ZC (element 620) is set to NC in prescribed relationship in accordance with an aspect of the invention, to the setting of ZB as set forth in Table 1 above. This insures, in accordance with an aspect of the invention, that the frequency associated with ZC does not exceed the frequency associated with ZB. Otherwise, the adjustment of impedance elements 620 and 613, respectively, diverge and an improper adjustment of the canceler characteristic results. Then, operational block 739 disables 1400 Hz and the second adjustment procedure is employed. If the test result is no, control is transferred to operational block 720 and the first procedure continues.

Operational block 720 causes the gain (K) subroutine to be effected, thereby adjusting gain (K) in the midfrequency range.

Conditional branch point 721 tests to determine if there was any change in the settings of K. If the test result is yes, control is returned via operational block 722 which disables 1400 Hz to conditional branch point 716 and steps 716-721 in the group are iterated. This is required because of interaction of the adjustments of ZC and K. If the test result is no, control is transferred to operational block 723 which causes 1400 Hz to be disabled and 2800 Hz to be enabled.

Operational block 724 causes the ZB null subroutine to be effected again.

Operational block 725 causes the null subroutine associated with adjusting impedance element 608 (ZA) via control signals ZA0-ZA5 to be effected. This adjusts the canceler characteristic in the high frequency range above 2800 Hz. There was no need to adjust ZA until the canceler characteristic is close to optimum. Specifically, the adjustment of ZA effects a more optimum match for nonloaded cable having gauges other than 26, for example 22 and 24 gauge.

Conditional branch point 726 tests to determine if the setting of ZA has changed from the setting prior to steps 724 and 725. If yes steps 724-726 in the group including are iterated until a no result is obtained.

Operational block 727 causes IT REG. to be incremented, thereby indicating that the first procedure has proceded through a pass including step 727.

Conditional branch point 730 tests to determine if any of the settings of ZC, K, ZB or ZA have changed from their previous settings. If the test result is yes, control is returned to conditional branch point 716 via operational block 731 which disables 2800 Hz. If the test result is no, control is transferred to conditional branch point 732.

Conditional branch point 732 tests to determine if A REG.=1. If the test result is yes, control is transferred to operational block 734 which increments A REG. If the test result is no, control is transferred to operational block 733 which disables 2800 Hz. This test determines whether one sequence of adjustment has been made before readjusting the low frequency end of the canceler characteristic. The sequence through step 732 is used to insure that the adjustment of impedances ZC, K, ZB and ZA are fairly closer to optimum.

Accordingly, operational block 735 causes 2800 Hz to be disabled and 350 Hz to be enabled.

Operational block 736 causes the K null subroutine to be effected again.

Operational block 737 causes the PL null subroutine to be effected again.

Operational block 738 causes the K null subroutine to be effected again.

As indicated above, steps 735-738 readjusts the adjustable pole PL and gain (K) in the low frequency range. Thereafter, control is returned to step 716.

Upon conditional branch point 732 yielding a no result, the first procedure is essentially completed and the canceler characteristic is adjusted to a substantially optimum match to the nonloaded cable connected to terminals T and R.

The second adjustment procedure is used when ZC and ZB are set, in accordance with an aspect of the invention, to values in prescribed relationship so that the frequency associated with ZC is equal to or does not substantially exceed the frequency associated with ZB. Under this condition, the transfer characteristic appears essentially as a fourth order function with a second order pole-zero pair, and we have determined that only ZA and K need be adjusted in the mid and high frequency ranges and, then, a compromise value equal to one half the sum of the K and ZA values at 2800 Hz and 400 Hz is used. This second procedure is set out in steps 740 through 751.

Upon the impedance elements of canceler 111 being adjusted by the first procedure or by the first procedure in combination with the second procedure, control is transferred to operational block 752 and the unidirectional facilities are reconnected via CIP=0.

The routine is ended via oval 753.

By employing the above procedure the nonloaded canceler characteristic is rapidly adjusted to match the 2-wire nonloaded cable connected to T and R (FIG. 1). From experimental practice this occurs on average in less than one (1) second.

Figure 8:
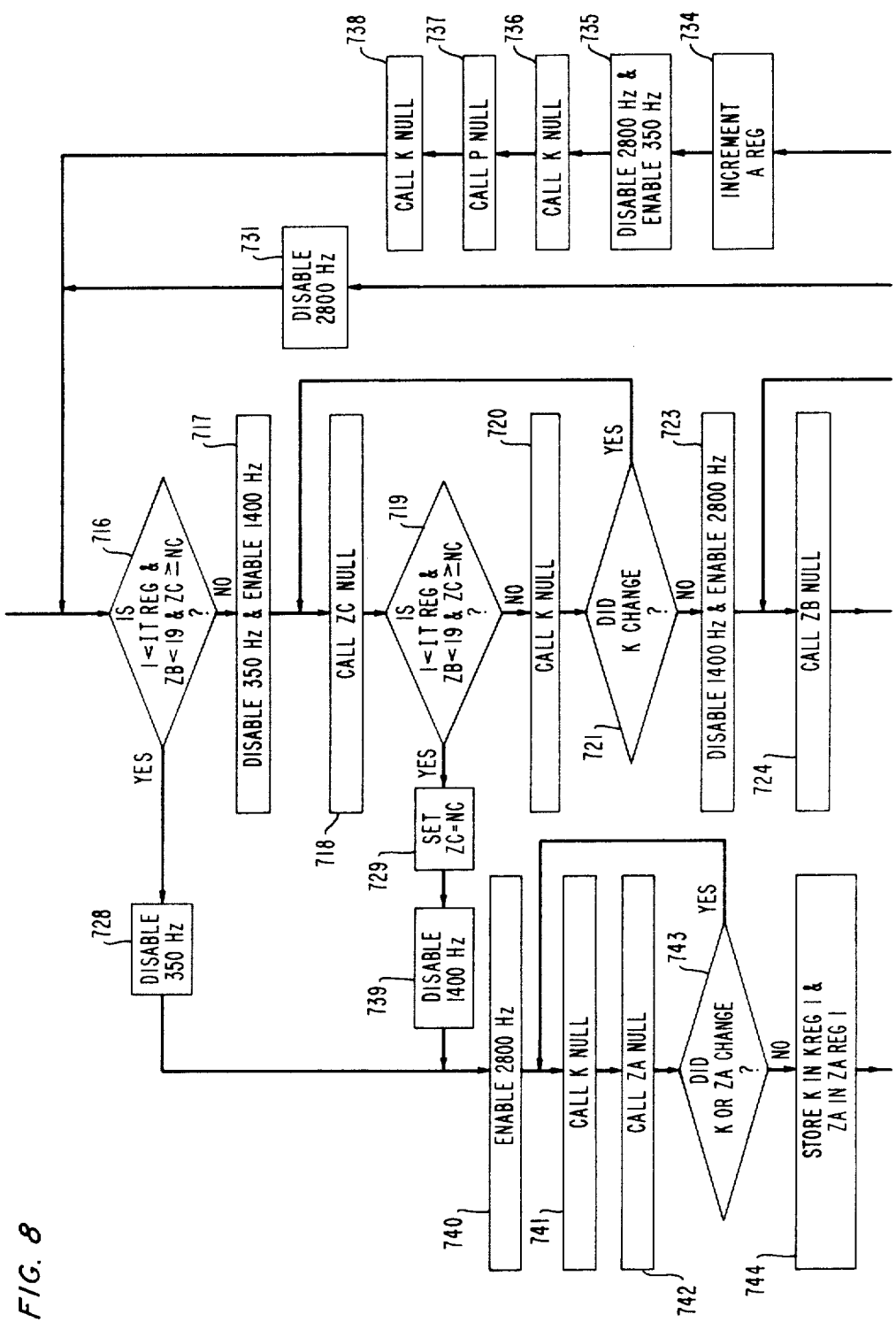
Figure 9:
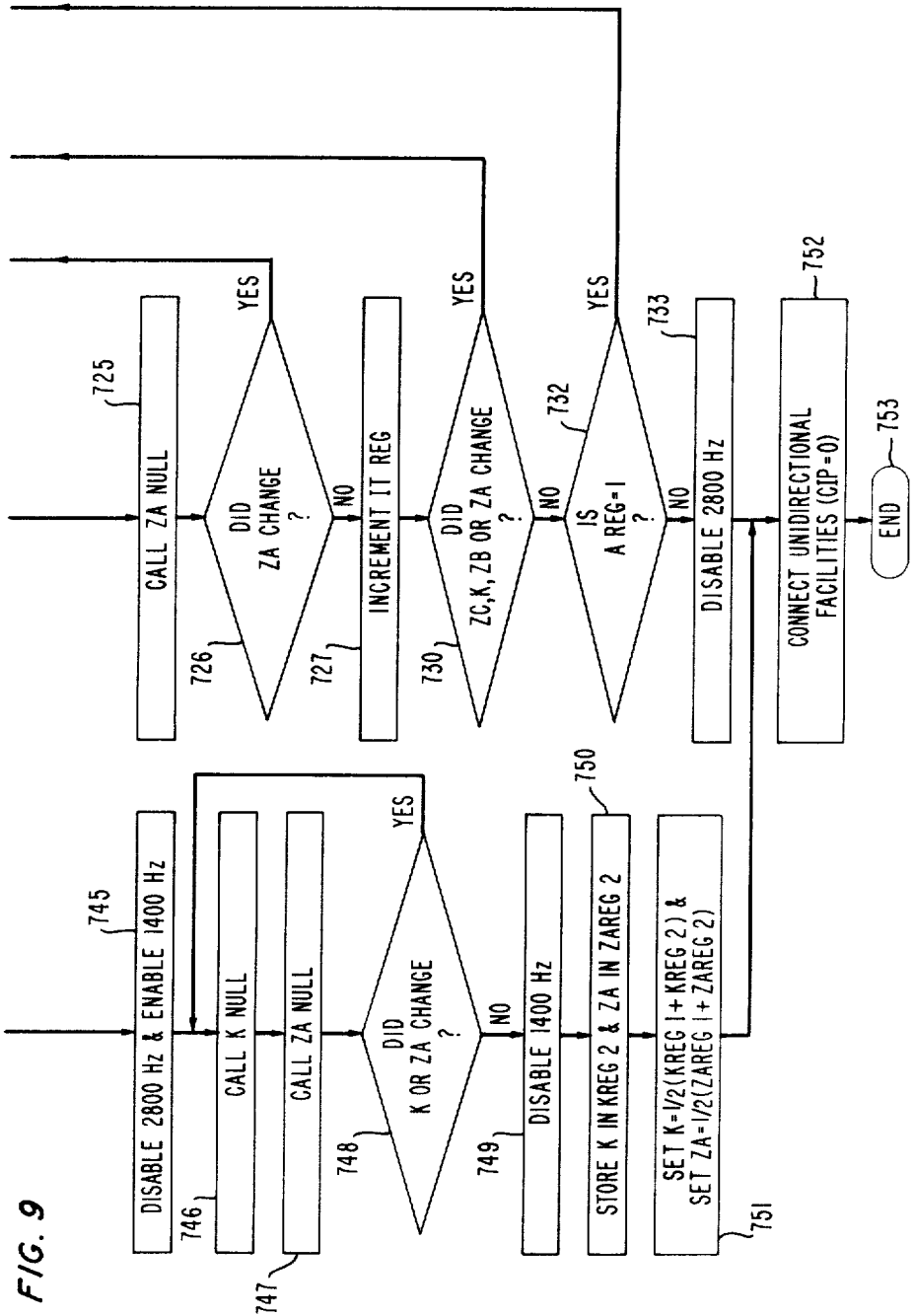
Figure 11:
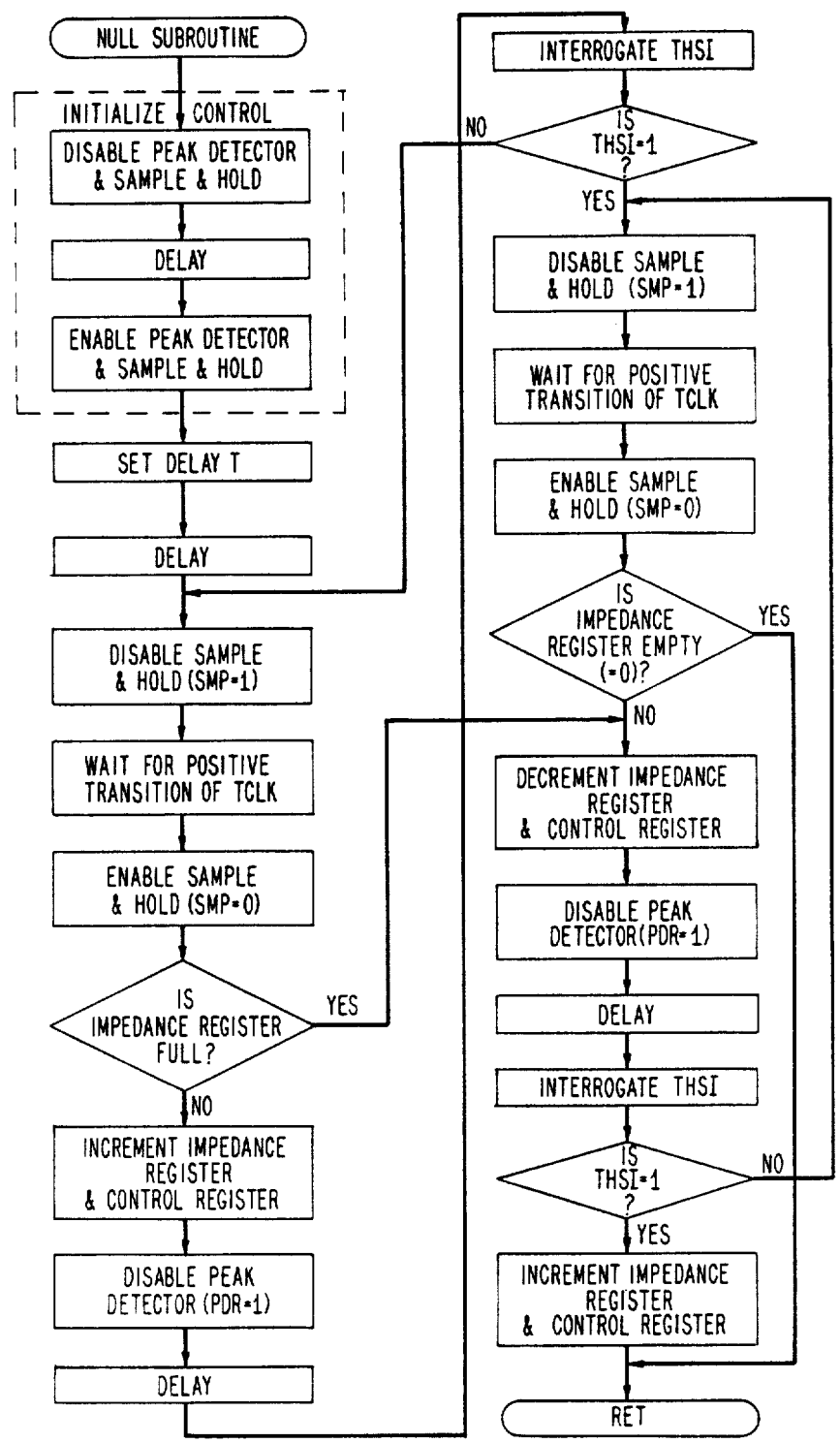
FIG. 11 is a flow chart of the amplitude null search subroutine employed in the adjustment of the adjustable capacitor and impedance elements in the canceler circuit employed in the network of FIG. 1.

FIG. 8 shows a flow chart of the adjustable impedance and amplitude null search program subroutine employed in the nonloaded facility adjustment routine shown in FIG. 7. The null search routine first steps the corresponding impedance adjustment in a predetermined direction until a first increase is detected in the amplitude of the signal at the output of gain unit 106. Then, the impedance adjustment is stepped in a direction opposite to the first direction until a second increase is detected in the amplitude of the signal at the output of gain unit 106. Thereafter, the impedance adjustment is stepped one step in the first direction to obtain the desired amplitude null. This procedure simplifies the search routine.

The adjustment and null search routine of FIG. 8 is essentially identical to that disclosed in the copending application of J. F. Rizzo and J. A. Rudisill, Jr., Ser. No. 064,041 (now U.S. Pat. No. 4,278,848, issued July 14, 1981), noted above. However, in this routine the initialization of detectors 108 is included in the adjustment and amplitude null search routine.

We claim:

1. A transmission network adapted to couple a unidirectional receive path and a unidirectional transmit path to a bidirectional path including a 2-wire nonloaded type cable comprising:

a canceler including means for generating a correction signal which is substantially a replica of an error signal developed in the network and included as a component of a transmit signal supplied to the transmit path, said correction signal generating means including a plurality of controllably adjustable impedance elements;

controllable signal generating means for supplying predetermined test signals to the receive path;

signal detection means for detecting signal amplitudes on the transmit path;

means for algebraically combining said correction signal with the transmit signal;

control means for generating control signals to controllably adjust said plurality of impedance elements in said correction signal generating means in at least a first procedure including a first prescribed adjustment sequence, each of said impedance elements being adjusted in said first adjustment sequence while supplying a corresponding one of said test signals to the receive path to obtain an amplitude null in the transmission path as detected by said detection means, said first adjustment sequence including multiple iterative adjustment of predetermined ones of said impedance elements for automatically converging said correction signal generation means to have an optimum transfer function which substantially matches the impedance developed in the network when the bidirectional path is connected thereto so that said correction signal is substantially a replica of the error signal, said first adjustment sequence including iterative adjustment of predetermined ones of said impedance elements in predetermined groups and multiple iterative adjustment of said groups of impedance elements until no change in the impedance adjustments occur, and said first procedure including a determination of whether a first frequency associated with a predetermined first one of said adjustable impedance elements at which a corresponding first pole or first zero occur is equal to or greater than a second frequency associated with a predetermined second one of said adjustable impedance elements at which a corresponding second pole or second zero occur, and said control means generating control signals to constrain impedance settings of said first and second impedance elements so that the first frequency does not substantially exceed said second frequency.

2. A transmission network as defined in claim 1 wherein said first adjustment sequence includes setting the impedance values of said first and second impedance elements in prescribed relationship when the first frequency is equal to or greater than the second frequency and wherein said control means generates control signals to effect a second procedure for adjusting third and fourth ones of said adjustable impedance elements in a second prescribed sequence with predetermined ones of said test signals being supplied to the receive path until amplitude nulls are obtained of corresponding signals developed on the transmit path.

3. A transmission network as defined in claim 2 wherein said second procedure includes adjusting said third and fourth impedance elements with first and second predetermined ones of the test signals being supplied to the receive path to obtain amplitude nulls of signals developed on the transmit path, averaging the impedance values of said third and fourth impedance elements obtained with said first and second test signals supplied and setting said third and fourth impedance elements to said averaged values.

4. A transmission network adapted to couple a unidirectional receive path and a unidirectional transmit path to a bidirectional path including a 2-wire nonloaded type cable comprising:

a canceler including means for generating a correction signal which is substantially a replica of an error signal developed in the network and included as a component of a transmit signal supplied to the transmit path, said correction signal generating means including a plurality of controllably adjustable impedance elements;

controllable signal generating means for supplying predetermined test signals to the receive path;

signal detection means for detecting signal amplitudes on the transmit path;

means for algebraically combining said correction signal with the transmit signal;

control means for generating control signals to controllably adjust said plurality of impedance elements in said correction signal generating means in at least a first procedure including a first prescribed adjustment sequence, each of said impedance elements being adjusted in said first adjustment sequence while supplying a corresponding one of said test signals to the receive path to obtain an amplitude null in the transmission path as detected by said detection means, said first adjustment sequence including multiple iterative adjustment of predetermined ones of said impedance elements for automatically converging said correction signal generation means to have an optimum transfer function which substantially matches the impedance developed in the network when the bidirectional path is connected thereto so that said correction signal is substantially a replica of the error signal, said correction signal generating means including means for generating a first pole-zero pair having a pole and a zero which occur at frequencies in a predetermined relationship to each other, means for generating a second pole-zero pair having a pole and a zero which occur at frequencies in a predetermined relationship to each other, means for generating a third pole-zero pair having a pole and a zero which occur at frequencies in a predetermined relationship to each other, and means for generating a fourth pole-zero pair.

5. A transmission network as defined in claim 4 wherein said first pole-zero frequencies are directly proportional to each other, said second pole-zero frequencies are directly proportional to each other, said third pole-zero frequencies are in a predetermined fixed relationship to each other, said fourth zero occurs at a predetermined frequency and said fourth pole occurs in a predetermined frequency range.

6. A transmission network as defined in claim 5 wherein said first pole-zero generating means includes a first adjustable impedance for adjusting the frequencies at which said first pole and zero occur, said second pole-zero pair generating means includes a second adjustable impedance for adjusting the frequencies at which said second pole and zero occur, said third pole-zero pair generating means includes a third adjustable impedance for adjusting the frequencies at which said third pole and zero occur and said means for generating said fourth pole includes a fourth adjustable impedance for adjusting the frequency at which said fourth pole occurs.

7. A transmission network as defined in claim 5 wherein the frequency at which said first pole occurs is directly proportional to and less than the frequency that said first zero occurs, the frequency at which said second pole occurs is directly proportional to and less than the frequency at which said second zero occurs, and the frequency at which said thrid pole occurs is a fixed frequency increment greater than the frequency at which said third zero occurs.

8. A transmission network as defined in claim 5 wherein said control means generates control signals for adjusting predetermined ones of said adjustable impedance elements so that frequencies associated with said predetermined ones of said impedance elements at which corresponding poles and zeros occur in a transfer function generated thereby are constrained to be in a prescribed relationship.

9. A transmission network as defined in claim 5 wherein said control means generates control signals for adjusting first and second ones of said adjustable impedance elements so that a first frequency determined by said first impedance element at which a corresponding first pole and first zero occur in a transfer function generated by the impedance elements is constrained not to be substantially higher than a second frequency determined by said second impedance element at which a corresponding second pole and second zero occur in the transfer function.

10. A transmission network as defined in claim 5 wherein said control means generates control signals for adjusting first and second predetermined ones of the adjustable impedance elements so that when a first frequency determined by said first impedance element at which a corresponding pole and zero occur in a transfer function generated by said correction signal generating means is equal to or greater than a second frequency determined by said second impedance element at which a corresponding pole and zero occur in the transfer function, the impedance value of said first impedance element is set to a value in prescribed relationship to a value of said second impedance element at said second frequency.

* * * * *